United States Patent [19]

Menard et al.

[11] 4,414,804

[45] Nov. 15, 1983

[54] APPARATUS FOR IGNITION AND REIGNITION FOR A GAS TURBINE

[75] Inventors: Christian Menard, Maurepas; Daniel Marouby, Viroflay; Alain Chollet, Paris, all of France

[73] Assignees: Automobiles Peugeot; Automobiles Citroen, both of Paris, France

[21] Appl. No.: 334,220

[22] Filed: Dec. 24, 1981

[30] Foreign Application Priority Data

Dec. 24, 1980 [FR] France .................. 80 27475

[51] Int. Cl.³ .................. F02C 7/26; F02C 7/262
[52] U.S. Cl. .................. 60/39.141; 60/39.827
[58] Field of Search .......... 60/39.091, 39.141, 39.827; 315/209 CD, 209.5 CR

[56] References Cited

U.S. PATENT DOCUMENTS

| | | | |
|---|---|---|---|
| 2,697,184 | 12/1954 | Lautenberger | 60/39.827 |
| 3,504,490 | 4/1970 | Klamm | 60/39.091 |
| 3,600,887 | 8/1971 | Gault et al. | 60/39.141 |
| 3,869,645 | 3/1975 | Collins | 60/39.141 |
| 3,900,017 | 8/1975 | Collins | 60/39.141 |

*Primary Examiner*—L. J. Casaregola
*Attorney, Agent, or Firm*—Brisebois & Kruger

[57] ABSTRACT

A spark ignition system for a gas turbine electronically controls the cycle of charge and discharge of a spark generator of the capacitive type. There is a function generator (5) which derives a reference voltage as a function of the speed of the turbine and possibly of other parameters. A charge control (6) for the capacitive cell (9) and a spark frequency control (7) are controlled by the reference voltage. Reignition in the case of flame extinction is controlled by an opto-electronic arrangement (11, 12, 13) which drives a reignition circuit (14), when flame extinction is detected. The reignition circuit produces a voltage which is superimposed on and over-rides the speed reference voltage to activate the system to produce ignition at a start condition.

The system can be used for ignition of a gas turbine, especially a turbo-compressor.

9 Claims, 4 Drawing Figures

APPARATUS FOR IGNITION AND REIGNITION FOR A GAS TURBINE

This invention has for an object an apparatus for spark ignition of fuel in the combustion chamber of a gas turbine of turbo-compressor turbine, comprising electronic control means for the cycle of charge and discharge of a spark generator of the capacitive type, as a function of one or more parameters of the state or condition of operation of the turbine.

The invention has also as an object, a device to detect the extinction or loss of the flame in the combustion chamber and to reignite the combustion.

In gas turbines one uses a spark ignition device, as in controlled or timed ignition motors, for igniting the air fuel mixture in the combustion chamber. The ignition device need operate only when starting the turbine and as a guarantee against flame extinction. Flame loss or extinction can result, for example, from an interruption of fuel feed or from blowing out of the flame due to turbulence in the combustion chamber.

In such a device an electrical discharge of predetermined energy and duration must occur between the electrodes of a spark plug at a specified frequency to cause combustion of the mixture. Consequently, one of the most common reasons why combustion does not occur or stops is insufficient energy of the discharge.

On the other hand, the ignition device operates under particularly severe conditions. The source of supply, often called the exciter, must furnish electrical pulses of very high voltage and energy, and at a very high rate of repetition. The device must also function in a pressure range of from 3.5 bars to more than 140 bars with surface temperature variations nearing 1000° C.

The electrodes are often covered with liquid fuel during a cold start of the turbine. The life expectancy of the device, and especially the plugs, is correspondingly very limited. To increase this life it is known to use a device to detect the shaft speed of the turbine and to automatically disconnect the ignition energy source in response to the speed of the shaft.

But in gas turbines, in addition to during starting, there are other situations in which ignition is necessary. In essence, gas turbines operate with significant excess air which blows at high velocity on the injectors and the flame is in constant danger of being blown out, and thus combustion ceases as a result of variations in operating conditions, such as variations of the speed of the air, variations of the temperature and/or in the pressure, and/or of the rate of fuel flow. This is why it is customary to equip such a system with a device to automatically detect an extinction of the flame, and to automatically reignite the combustible mixture in the event of extinction. One is familiar with ignition devices for turbines in which the extinction of the flame is detected by using as a parameter the speed of the turbine, and when the speed falls below a predetermined level it is assumed that extinction has occurred and the ignition device is then reactivated.

Recognizing the wide range of speeds at which a turbine operates, such detection devices which depend on speed as an indication of flame loss are not satisfactory.

A first object of the invention is to provide an improved ignition system for gas turbines of the capacitive type which is able to supply, under all circumstances, optimal energy for starting and maintaining combustion, while considerably increasing the life expectancy of the components of the system and especially the spark plugs.

To this end a device or system according to the invention is characterized in that control means for the charge and discharge cycle control both the charging voltage and the discharge frequency of the spark generator as a function of the speed of the motor shaft of the turbine and ultimately other parameters of the state of operation of the turbine.

The values of the voltage and the frequency are preferrably at a maximum at zero speed of the turbine shaft or during extinction of the flame in the combustion chamber, but decreases as turbine speed increases.

A system according to the invention is also characterized in that a charge converter comprising a high voltage oscillator ensuring the charge of a capacitive cell, is controlled by closed loop comparison, of a regulating voltage derived from a reference voltage transmitted from a function generator and representing the speed of the turbine and possibly other parameters, with the charge voltage of the capacitive cell.

Another object of the invention is to ensure reignition of the turbine in a reliable and efficient manner in the event of flame extinction. This is accomplished using flame detection means of the optical-electronic type comprising, an optical detector, an optical fiber transmitting the detected light to an interface transmitting, as a function of the light signal received, an electrical signal commanding maximum energy from the ignition device in the case of flame extinction. The reignition device derives, in a converter stage a reference voltage which is superimposed on the regulating voltages representative of the reference voltage provided by the function generator, the regulating voltages controlling respectively, the charge control device and the discharge control of the capacitive cell.

In accordance with the invention the system provides a spark of maximum frequency and energy when it is most needed, during start up, and reignition after flame extinction. During normal running of the turbine the spark frequency and intensity is decreased thereby insuring long spark plug life.

Other characteristics of the invention will become evident upon consideration of the following description with reference to the drawings.

DETAILED DESCRIPTION

Figure 1:
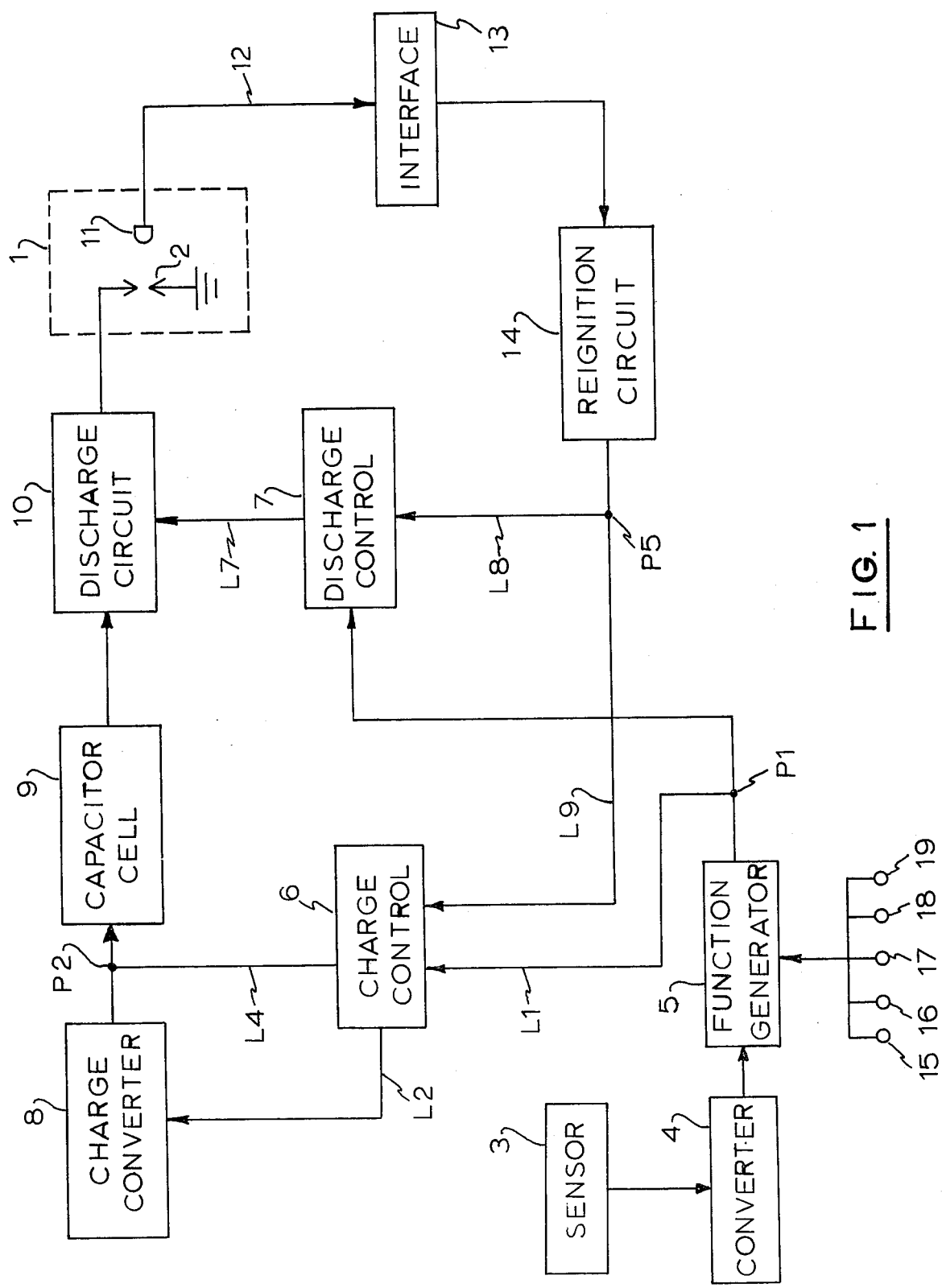
FIG. 1 is a block diagram of an ignition system according to the invention.
Figure 2:
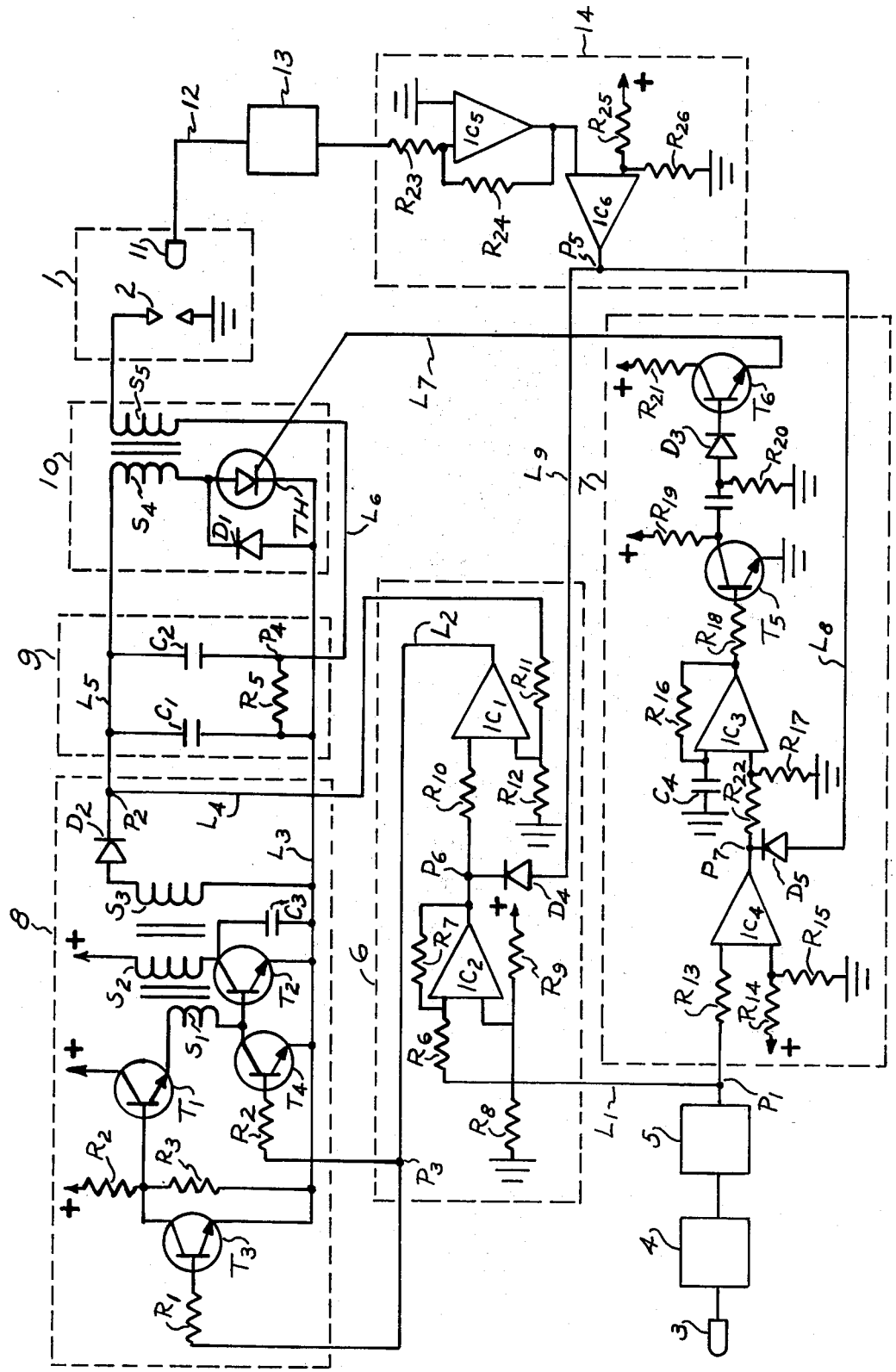
FIG. 2 is a non-limiting example in schematic, of one embodiment of such a system.

The circuits of Blocks 6 to 10 and 14 of FIG. 1 are shown in detail at FIG. 2, and are enclosed in broken line blocks identified by the same numbers in FIG. 1. For greater clarity, FIG. 1 also identifies conductor connector lines L1 to L9 and connection points or junctions P1 to P7, which correspond to those of FIG. 2.

To facilitate explanation, VR1 to Vr3 and VR5 to VR7 will be used to designate the respective voltages at P1 to P3 and P5 to P7.

The ignition system includes (FIG. 1):

in combustion chamber 1 of a turbine (not shown), a spark plug or spark gap 2;

a sensor 3 providing an output signal whose frequency is proportional to the speed of the turbine motor shaft;

a frequency to voltage conversion circuit 4 for determining the turbine speed, and providing an output voltage proportional to this speed;

a function generator 5 producing, as a function of the speed and ultimately other parameters of the state of operation of the turbine or the turbo-compressor, a modulated voltage VR1 at its output and which appears at P1. These other parameters are supplied by sensors 15 to 19 which can for example supply signals indicative of the rate of fuel flow, fuel temperature, air temperature, cooling circuit temperature, and the discharge pressure of the turbo-compressor. The electronics comprising function generator 5 can be digital or analog;

a detection and automatic reignition device to be used in case of flame extinction and comprised of an optical flame detector 11, disposed in the combustion chamber, a fiber optic line 12 connecting detector 11 to an optoelectronic interface 13 which provides an electric signal as a function of the received optical signal, to a reignition circuit 14 which delivers a voltage VR 5 from its output to point P5;

a charge control circuit 6 for controlling a charge transformer or converter 8;

a discharge control circuit 7 for controlling the discharge of discharge system 10;

a capacitive cell 9 having at least one condenser.

The principle of operation of the ignition system is as follows.

Capacitive cell 9 is charged to a voltage VR2 appearing at P2 from the charge converter 8 which is in a closed loop circuit with charge controller 6. Charge controller compares voltage VR2 from P2, with the voltage derived as a function of output voltage VR1 from function generator 5 from P1, or output voltage VR5 from P5 of the reignition circuit 14. Discharge control 7 furnishes gating pulses to a thyristor of discharge circuit 10 at a frequency which it determines as a function of voltages VR1 or VR5.

Figure 3:
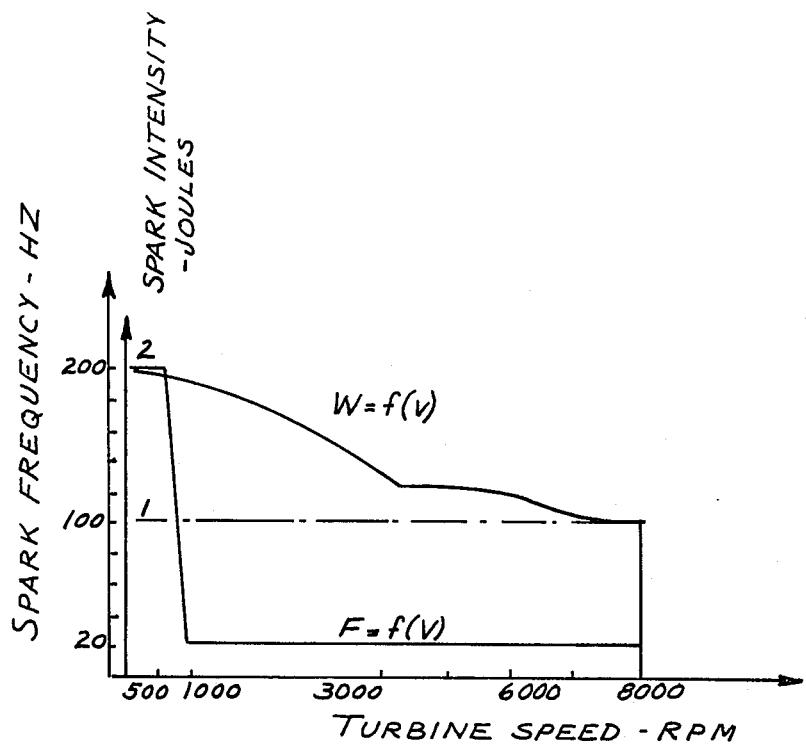
FIG. 3 is a graph showing variation of the energy and the frequency of the spark.
Figure 4:
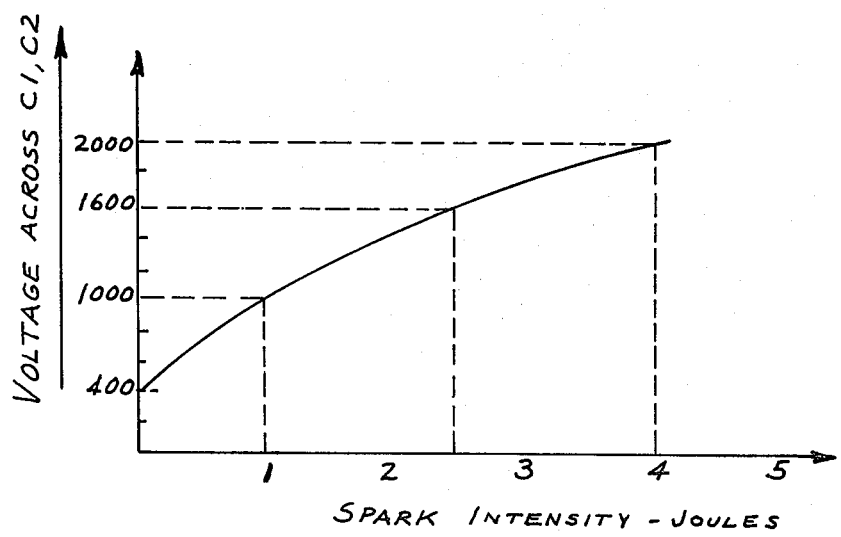
FIG. 4 is a graph showing relation between the discharge energy or power and the potential difference at the terminals of the capacitive cell.

FIGS. 3 and 4 show an example of the variation of charge voltage, and thus spark energy, and discharge frequency as a function of the turbine speed, which can be obtained with the apparatus of this invention. The charge voltage and frequency of discharge are at a maximum at the time of starting the turbine. It is advantageous, to ensure the best reignition conditions, that the reignition control voltage VR5 produces both the maximum level of the charge voltage and frequency of discharge.

Instead of controlling charge control device 6 and discharge control device 7 by means of voltages VR1 or VR5, it would be possible to input voltage VR5 into function generator 5 as one of the parameters for deriving voltage VR1. For reignition security it is however preferable to operate as in the example described.

The circuits of blocks 6 to 10 and 14 will now be described in greater detail with reference to FIG. 2. The power supplies at the common source of positive voltage, the connections to ground and various elements such as stabilizing or biasing resistors, having customary and obvious functions, will not be described.

CHARGE CONTROL 6

Charge control 6 comprises essentially, a comparator IC 1 and an operational amplifier IC 2. A first input of comparator IC 1 is connected, on the one hand to the output of operational amplifier IC2 and, on the other hand, to the output at P5 of reignition circuit 14 by line L9 through diode 4. The second input of comparator IC 1 is connected to capacitive cell 9 at point P2 of line L5 through line L4. The output of comparator IC1 is connected to P3 at the input of charge converter 8 by line L2. Finally, the input of operational amplifier IC2 is connected to P1 at the output of function generator 5 by line L1.

DISCHARGE CONTROL 7

Discharge control 7 essentially comprises an oscillator or relaxation circuit IC3, a comparator IC4, and a driven circuit including two transistors T5 and T6. The frequency of oscillator IC3 is controlled by the voltage applied to its input from P7. Input P7 of oscillator IC3 is connected, on the one hand, to the output of comparator IC4 and, on the other hand, through diode D5 and line L8, to output at P5 of reignition circuit 14. One input of comparator IC4 is connected to the output at P1 of function generator 5. The discharge control pulses for discharge circuit 10 are transmitted by transistor T6 controlled by T5, which is itself controlled by the frequency of oscillator IC3.

CHARGE CONVERTER OR TRANSFORMER 8

Charge converter 8 is comprised essentially of a high voltage oscillator having transistors T1 and T2 and coils or inductors S1 and S2. Coil S1 is connected in reverse feed-back in the base of transistor T2. The oscillator is driven by transistors T3 and T4 whose bases receive from input P3, a voltage VR3 from control device 6 via line L6. The collector of transistor T3 is connected to the base of transistor T1 and the collector of transistor T4 is connected to the base of transistor T2. The emitters of transistors T2, T3 and T4 are connected to line L3, the common negative reference line of charge converter 8, capacitive cell 9, and discharge circuit 10. Coil S2 forms with coil S3, a voltage step-up transformer. The voltage is rectified by diode D2 at the output of coil S3 toward capacitive cell 9. The current thus obtained charges capacitive cell 9.

CAPACITIVE CELL 9

Capacitive cell 9 is comprised of two capacitors C1 and C2 connected to line L5 connected to the cathode of the diode D2 and point P2. The other plate of C1 is connected to L3 and a resistance R5 is connected between output point P4 and line L3.

DISCHARGE CIRCUIT 10

Discharge system or circuit 10 comprises a thyristor TH (an SCR) whose gate receives through line L7 control or trigger pulses from discharge control 7, and a transformer having windings or coils S4 and S5. The primary coil S4 is connected to line L5 in series with the anode of TH whose cathode is connected to L3. A protective diode D1 is connected between the cathod and the anode of thyristor TH. Finally, the secondary coil S5 is connected in series between the plug 2 and the point P4, via line L6.

REIGNITION CIRCUIT 14

Circuit 14 comprises an impedance matching circuit IC5 and a calibrating comparator IC6. The input of circuit IC5 is connected to the output of opto-electronic interface 13 and its output to an input of comparator IC6 which delivers at its output P5 the calibrated control voltage VR5 for reignition.

OPERATION OF THE SYSTEM

The operational amplifier IC2 derives as a function of the voltage VR1 supplied to it by function generator 5, from P1, a regulation voltage VR6 which appears at P6. Comparator IC1 compares voltage VR2 from capacitors C1 and C2 at P2 with regulation voltage VR6 and so acts on the bases of transistors T3 and T4 that the oscillator of charge converter 8 is blocked for predetermined comparison values. The transformer ratio of coils S2, S3 determines a voltage peak much greater than 1000 volts. The current and voltage charge on capacitors C1 and C2 is continuous, while thyristor TH is blocked.

While transistor T1 is blocked by transistor T3, the imbalance caused by the induction of coils S1 and S2 which have parasitic capacitance can cause a weak oscillation which prevents complete blocking of the oscillator were it not for transistor T4 which at the same time, turns transistor T2 off, thus interrupting the connection through transistor T2 to line L3. Since T4 is on, to turn T4 off, these spurious oscillations are bled off to line L3.

When capacitors C1 and C2 are charged to voltage VR2 determined by the law of modulation, the charge converter is thus blocked. In this manner, control of the closed loop circuit of the charge of capacitive cell 9 is assured. When the thyristor TH receives a gate pulse from discharge control 7, capacitor C1 discharges through coil S4 which induces in coil S5, a sufficient voltage to initiate discharge between the electrodes of spark plug 2. Capacitor C1 is selected and sized to ensure the accumulation of the necessary energy for the formation of a spark peak, that is, ignition ionization, across the transformer S4, S5. Capacitor C2 assures post-discharge, that is, it supplies the energy and duration of spark necessary to obtain ignition, when the ionization has been sufficient to assure the passage of the discharge current between the electrodes of the plug 2. Capacitor C1 discharges almost instantaneously while the discharge of C2 is slower due to resistance R5 in its discharge circuit and which also protects thyristor TH.

Comparator IC4 delivers, as a function of voltage VR1, a voltage VR7 which determines the frequency of oscillator IC3. The control pulses to the gate of thyristor TH are transmitted by transistor T6 driven by transistor T5, at the frequency of oscillator IC3.

The comparator IC4 compares the voltage VR1 with a constant voltage determined by resistors R14 and R15. When the voltage VR1 is greater than the constant voltage from R14, R15, the output voltage VR7 of IC4 is of a value which determines a first frequency of oscillation of oscillator IC3. When the voltage VR1 is lower than the constant voltage from R14, R15, the voltage VR7 is of a value which determines a second but lower frequency. As shown at FIG. 3, the first or higher frequency is 200 Hz, and the second or lower frequency is 20 Hz. The charge from the first frequency to the second frequency occurs quite rapidly at a voltage VR1 corresponding to a turbine shaft speed of about 1000 rpm.

It is believed evident from the foregoing that voltage VR 7 at P7, from IC4, is initially high to cause oscillator IC3 to oscillate at a high frequency i.e. 200 HZ during start up and at very low turbine speeds. Also, the regulating voltage VR6 at P6 from IC2 is high to thereby cause the output voltage of IC1 to be null or negative thus blocking T3 and T4 to turn T1 and T2 full on for maximum charging of capacitor cell 9. Correspondingly, during start up the spark at spark plug 2 is of maximum frequency and intensity.

As the turbine shaft speed increases the voltage VR1 at P1 from the function generator 5 causes voltage VR7 at P7 to decrease thus reducing the frequency of oscillator IC3 to the second frequency of 20 HZ and thus decreasing the gating frequency TH and the spark frequency at plug 2, to 20 Hz.

At the same time, the voltage at P6 from IC2 decreases to cause the voltage at P3 to become positive thus causing conduction of T3 and T4 which decreases the conduction of T1 and T2 thereby decreasing the charging voltage to capacitor cell 9. With the energy and frequency of the spark reduced the life of the plug 2 is greatly extended.

After each discharge, voltage VR2 returns to zero. Control voltage VR3 from comparator IC1 becomes zero, which blocks transistors T3 and T4. A new charge cycle then begins. However, the extent to which capacitor cell 9 charges is regulated by the comparitor IC1 which compares the charge voltage VR2 at P2 (through resistors R11, R12) with the voltage VR6 (through resistor R10), at its respective inputs. Since voltage VR 6 is a function of the turbine speed, the resulting spark intensity as shown at FIG. 3, decreases as the turbine speed increases.

When the flames goes out in the combustion chamber, regardless of speed, the luminous radiation which was transmitted by optical fiber 12 to the opto-electronic interface 13 is interrupted, so the output of interface 13 becomes zero. Comparator circuit IC6 then delivers at its output at P5 a voltage VR5. Voltage VR5 is superimposed at P6 and P7 on voltages VR6 and VR7 applied to the inputs of comparator IC1 and oscillator IC3, respectively, through diodes D4 and D5. The voltage VR5 is preferably equal to the voltages VR6 and VR7 transmitted respectively by comparators IC2 and IC4 when voltage VR1 supplied by function generator 5 indicates turbine starting conditions. This provides the same high levels of spark intensity and spark frequency for reignition as for starting.

The various elements IC1 to IC6 as well as transistors T1 and T6 can of course be made in the form of one or more integrated circuits.

We claim:

1. In a system of spark ignition and reignition of fuel in a combustion chamber of a gas turbine, comprising a function generator (5) for generating a reference voltage as a function of at least the speed of the motor shaft of the turbine, charging means (8) for charging a capacitive cell, means responsive to the reference voltage for producing a regulating voltage, charge control means (6) responsive to said regulating voltage and a voltage indication of the voltage charge on said capacitive cell to control the maximum voltage charge on the cell by controlling said charging means, discharge means for discharging said capacitive cell to produce a spark across a spark gap, means for deriving a control voltage in response to said reference voltage, and discharge control means (7) for controlling the frequency of discharge of said discharge means in response to said control voltage.

2. System according to claim 1 wherein the charge voltage and the discharge frequency are a maximum for the values of the reference voltage corresponding to a zero speed of the shaft of the turbine or the extinction of the flame in the combustion chamber.

3. System according to claim 1 comprising detection means (11, 12) for detecting the extinction of combustion flame, reignition circuit means (13, 14) responsive to flame extinction detected by said detection means for producing a reignition voltage, and conductor means for superimposing said reignition voltage on said regulating voltage and said control voltage to increase the charge voltage and the frequency of discharge to a maximum, to restore combustion.

4. System according to claim 3 wherein said flame detection means comprises optical fiber means (12) for transmitting light of combustion flame to an opto-electronic interface (13), said opto-electronic interface comprising means responsive to the absence of light for signaling a reignition circit (14) to produce said reignition voltage.

5. System according to claim 1 wherein said charge control means comprises a closed loop circuit including a comparator (IC1) for comparing the charge voltage of the capacitive cell with the regulating voltage.

6. System according to claim 5 wherein said charging means (8) comprises an oscillator having first and second transistors (T1 and T2) and first and second coils (S1 and S2), one of said coils (S1) being connected in reverse feedback in the base of the first transistor (T1), and wherein a third transistor (T3) controlled by the output voltage of said comparator blocks said first transistor (T1) at predetermined values of said output voltage.

7. System according to claim 6 wherein said charging means (8) further comprises a fourth transistor (T4) controlled by the output voltage of said comparator for eliminating parasitic oscillations in the first and second coils (S1, S2) of the oscillator.

8. System according to claim 1 wherein said discharge means comprises a thyristor (TH) gated by said discharge control means for discharging said capacitive cell.

9. Device according to claim 8 wherein said capacitive cell comprises two condensers (C1 and C2) whose discharge is controlled by a thyristor (TH, the first condenser (C1) discharging directly through a transformer winding in series with the thyristor to produce an initial high intensity spark across electrodes of the spark gap and the second condenser discharging through a resistor in series with the thyristor and winding to maintain the spark.

* * * * *